Feb. 26, 1924.                                            1,484,855
                        B. A. WINN
                          MOLD
                  Filed March 2, 1922         2 Sheets-Sheet 1
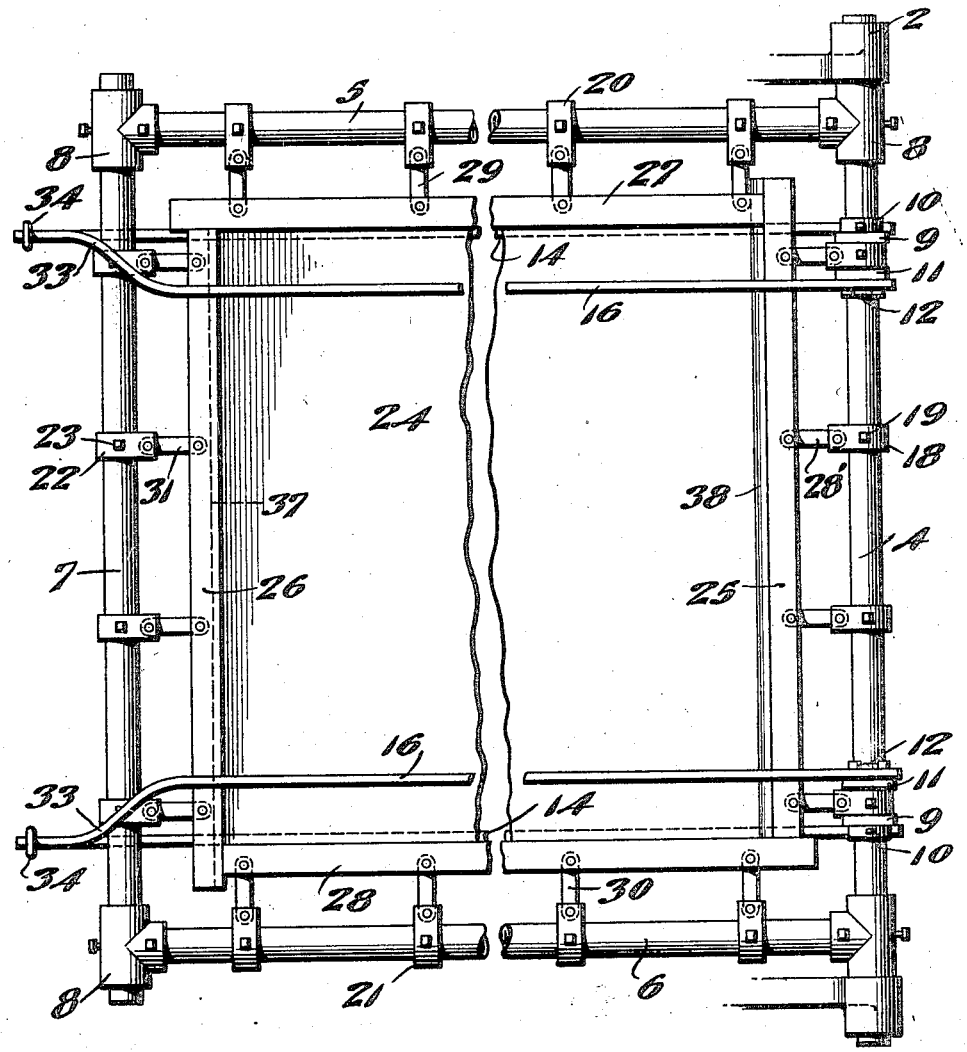

Feb. 26, 1924.  1,484,855
B. A. WINN
MOLD
Filed March 2, 1922   2 Sheets-Sheet 2
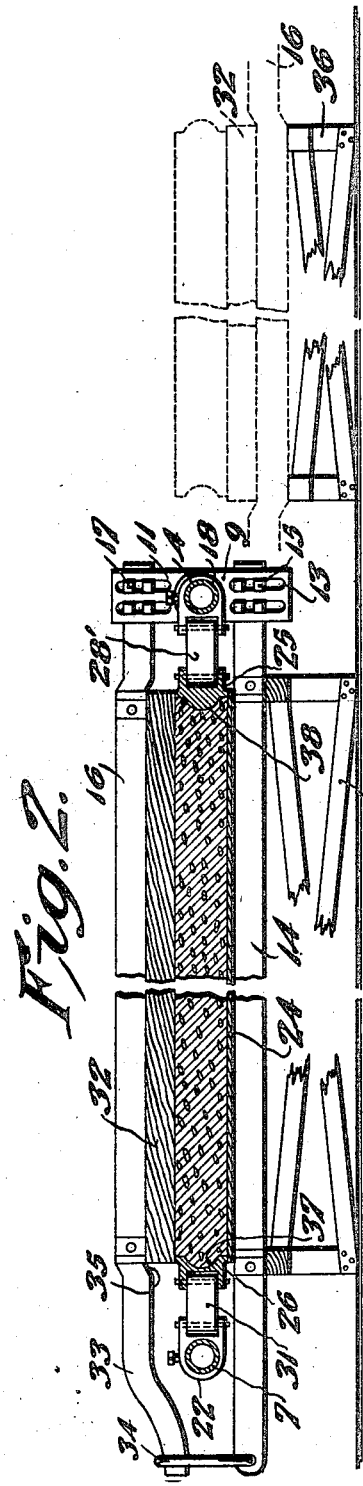
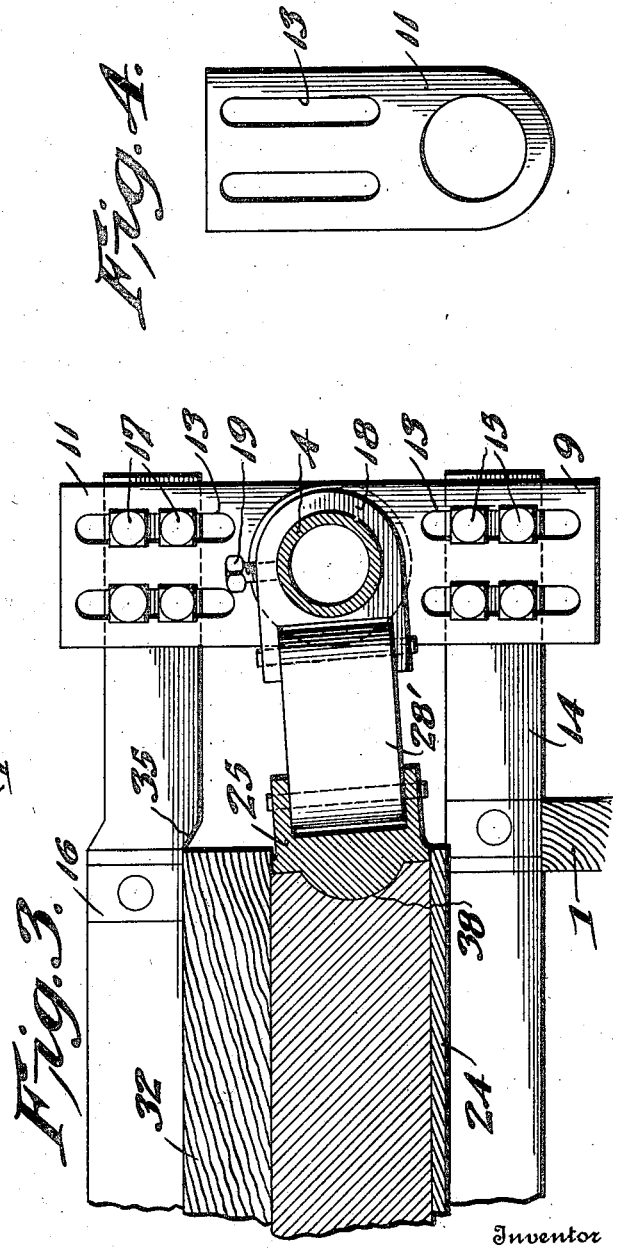
Inventor
Byron A. Winn
By McCracken & Patch
Attorneys Patented Feb. 26, 1924.

1,484,855

UNITED STATES PATENT OFFICE.

BYRON A. WINN, OF BARBER, IDAHO.

MOLD.

Application filed March 2, 1922. Serial No. 540,445.

*To all whom it may concern:*

Be it known that I, BYRON A. WINN, citizen of the United States, residing at Barber, in the county of Ada and State of Idaho, have invented certain new and useful Improvements in Molds, of which the following is a specification.

This invention relates to an improvement in molds, and more particularly to a mold adapted for forming concrete or other plastic materials in the manufacture of staves, blocks, or circular structures such as silos, bins, tanks and the like.

An object is to provide a mold in which blocks can be expeditiously formed, and with which the side portions of the mold can be withdrawn from the edges of the staves or blocks with an even sliding movement, thus adapting the structure for the removal of the mold within a short time after the block is formed.

A further object is to so construct the mold that the angle at which the edges of the staves or blocks are formed with respect to the faces thereof can be varied to adapt the staves or blocks for circular structures of different diameters.

A still further object is to provide a mold structure in which the staves or blocks are bodily moved from the position in which the molding step takes place and are deposited upon a pallet while yet confined within the mold, thus insuring that the staves or blocks will retain their molded form and will be in the best possible condition when the mold is removed.

With these and other objects which will be apparent from the drawings, specification and claims, this invention includes certain novel features of construction and combinations of parts which will now be set forth.

In the drawings:—

Figure 1 is a view in plan of a mold constructed in accordance with my invention.

Fig. 2 is a longitudinal sectional view taken through the mold structure on the line 2—2 of Fig. 1.

Fig. 3 is a sectional view showing a slightly different adjustment of the parts to vary the angle at which the end of a stave or block is formed.

Fig. 4 is a detail view to better disclose the structure of the adjustment bracket by which the angle of adjustment is attained.

The mold structure is supported upon a trestle or base frame 1, and the support is accomplished through bearings 2 and 3 which are mounted upon the trestle structure adjacent the end thereof. A shaft 4 is mounted in these bearings 2 and 3 and has a supporting frame structure made up of the end pieces 5 and 6 and a side piece 7 carried thereby. This supporting frame structure is of rectangular shape and is held together by corner members 8, the shaft 4 mounting one side of the rectangular frame and mounting the frame for swinging movement in the bearings 2 and 3.

The shaft 4 has adjustment brackets 9 pivoted thereon adjacent the end of the rectangular frame and these adjustment brackets are held in place by collars 10. Similar adjustment brackets 11, the construction of the adjustment brackets being better shown in Fig. 4, are mounted pivotally on the shaft 4 adjacent the bracket 9, these latter adjustment brackets being held against endwise movement on the shaft by pilot 12. The several adjustment brackets have slots 13 therein, and supporting bars 14 are secured by means of bolt 15 in conjunction with the adjustment bracket 9, clamp bars 16 being secured by bolts 17 in conjunction with adjustment bracket 11. By adjusting the bolts 15 and 17 in the slots 13 of the adjustment brackets 9 and 11 the relative position of the shaft 4 with respect to the bars 14 and 16 can be varied.

The shaft 4 has bearing members 18 fitted in spaced relation thereon and held in place by set screws 19, and similar bearing members 20, 21 and 22 are fitted on the frame members 5, 6 and 7, and held in place by set screws 23. The supporting bars 14 have a metal base plate 24 carried thereby, and this is horizontally disposed while the block or stave is being molded so that it forms the lower face of the block. This base plate may be curved to form the segment of any circle desired. The edges of the block are molded by the side members 25 and 26, and the end members 27 and 28. These side and end members are supported from the frame and particularly from the bearing members 18, 20, 21 and 22, by means of links 28', 29, 30, and 31, and are so mounted that they can be shifted endwise and in that relation are withdrawn from the edges of the block or stave after the same has been molded. When the side and end members are swung in to the block forming or molding position they will occupy substantially the relation shown in Fig. 1 and form a complete rectangular edge mold for the block or stave.

A variety of wooden pallets 32 are provided to be fitted over and on top of the side and end members of the mold after the block has been formed therein and the clamp bars 16 are then swung down to rest upon these pallet boards, the link 34 carried by the end of the supporting bars 14 being swung up to engage the curved ends 33 of these clamp bars to retain the same in position. The clamp bars are slightly offset as indicated at 35, so that the pallet board is firmly held against shifting.

In the use of my improved mold it is suitable that a block receiving and supporting structure 36 be provided alongside the trestle 1, and after a block has been molded within the side and end members upon the face plate 24 and a pallet board 32 has been swung in place upon the block the entire mold structure is swung over the mounting in bearings 2 and 3 to substantially the position shown in dotted lines in Fig. 2, and in this relation the link 34 is again released. The supporting bars 14 are then swung back to rest upon the trestle 1 and carry the face plate 24 therewith. The links 28', 29, 30, and 31 are then swung back to move the side and end members of the mold structure longitudinally and as the links move or swing upon an arc these side and end members will be withdrawn from the edges of the molded block. The block is then left upon the pallet board which is supported by the clamping bars 35, these bars resting upon trestle 36. The pallet board is presented in the position to be grasped in moving the block to any position where it is to be deposited to dry or cure, and the clamping bars can then be swung back to the position shown in full lines in Fig. 2, when another pallet board is to be swung in place.

The end member 27 has a groove 37 to mold a tongue on the corresponding edge of the block or stave, and the end member 28 has a projecting tongue or rib 38 which forms a groove in the opposite edge of the block. When the blocks are laid in a wall the tongue at the one edge of each block will engage in the groove of the next adjacent block and in this way the blocks will be tongue and grooved together to give greater support in the wall.

It will be appreciated that as the diameter of the circular silo, bin, or other structure of which the blocks are to form the wall, is increased or diminished the angle of the tongue and grooved edges will be less or more acute with respect to the face of the block or stave, and this angular variation is taken care of by adjusting the parts through the medium of bolts 13 and 17, substantially as shown in Fig. 3. When this adjustment has been accomplished the position of the bearings 20 and 21 can be set through the medium of set screws 23 and the parts are held in the proper relation for use in molding a number of blocks to have the same relative angle at the end.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. A mold comprising a rectilinear face plate, a frame conforming substantially to the shape of the base plate, side and end members to form the edges of a block, and links by which said side and end members are given swinging mounting upon the frame to be moved to a position to outline the edge of the block upon the face plate and to be shifted endwise to clear the edges of a molded block.

2. A mold comprising a face plate, a frame, side members carried by the frame disposed adjacent the sides of the face plate, end members associated with the frame and resting on the ends of the face plate, and means to change the position of the frame with respect to the face plate to vary the angle at which the faces of the end members are disposed with respect to the plate.

3. A mold comprising a face plate, a frame, side members carried by the frame disposed adjacent the sides of the face plate, end members associated with the frame and resting on the ends of the face plate, means to change the position of the frame with respect to the face plate to vary the angle at which the faces of the end members are disposed with respect to the plate, and links connected with said side and end members and with the frame to mount the side and end members for endwise swinging movement to be swung clear of the edges of a molded block.

4. A block mold comprising a face plate, a frame conforming substantially to the shape of the face plate, side and end members carried by the frame to mold the edges of a block, said side and end members being retractably mounted on the frame to be withdrawn from the edges of a block when molded, means to clamp a pallet on the top of a block mounted on the face plate, bearings by which the structure is mounted to be turned completely over when a block has been molded, and bearings by which the face plate is mounted to be removed to permit access to retract the side and end mold members.

5. A block or stave mold comprising with a substantially rectangular frame mounted at one edge for swinging movement on a horizontal axis, supporting bars given swinging mounting at the hinged edge of the frame, clamp bars mounted in a similar manner upon the frame, a mold face plate carried by the supporting bars, a trestle to support the structure in one extreme position with the supporting bars substantially horizontally disposed, a second trestle to support the parts in the other extreme with the clamp bars beneath and horizontally disposed, side and end members carried by the frame adjacent the face plate to mold the edges of the block or stave, and means to hold the clamp bar in position to clamp down a pallet against the top of the side and end members and a block molded therein.

6. A block or stave mold comprising with a substantially rectangular frame mounted at one edge for swinging movement on a horizontal axis, supporting bars given swinging mounting at the hinged edge of the frame, clamp bars mounted in a similar manner upon the frame, a mold face plate carried by the supporting bars, a trestle to support the structure in one extreme position with the supporting bars substantially horizontally disposed, a second trestle to support the parts in the other extreme with the clamp bars beneath and horizontally disposed, side and end members carried by the frame adjacent the face plate to mold the edges of the block or stave, means to hold the clamp bar in position to clamp down a pallet against the top of the side and end members and a block molded therein, and links by which the side and end members are mounted in conjunction with the frame to be swung endwise and retracted from the molded edges of a block.

7. A block or stave mold comprising with a substantially rectangular frame mounted at one edge for swinging movement on a horizontal axis, supporting bars given swinging mounting at the hinged edge of the frame, clamp bars mounted in a similar manner upon the frame, a mold face plate carried by the supporting bars, a trestle to support the structure in one extreme position with the supporting bars substantially horizontally disposed, a second trestle to support the parts in the other extreme with the clamp bars beneath and horizontally disposed, side and end members carried by the frame adjacent the face plate to mold the edges of the block or stave, means to hold the clamp bar in position to clamp down a pallet against the top of the side and end members and a block molded therein, links by which the side and end members are mounted in conjunction with the frame to be swung endwise and retracted from the molded edges of a block, and means to adjust the relative spacing of the frame with respect to the face plate to vary the angle at which the faces of the end members are disposed with respect to the plate.

In testimony whereof I affix my signature.

BYRON A. WINN.